UNITED STATES PATENT OFFICE.

JOHN M. WEISS, OF NEW YORK, N. Y., ASSIGNOR TO THE BARRETT COMPANY, OF NEW YORK, N. Y., A CORPORATION OF WEST VIRGINIA.

PROCESS OF IMPROVING THE COLOR AND ODOR OF CRUDE AROMATIC HYDROCARBONS.

1,206,962. Specification of Letters Patent. Patented Dec. 5, 1916.

No Drawing. Application filed January 22, 1913. Serial No. 743,438.

*To all whom it may concern:*

Be it known that I, JOHN M. WEISS, a citizen of the United States, residing in the borough of Manhattan, city, county, and State of New York, have invented new and useful Improvements in Processes of Improving the Color and Odor of Crude Aromatic Hydrocarbons, of which the following is a specification.

This invention relates to the treatment of crude aromatic hydrocarbons containing the benzene ring and has for its object the economical and effective decolorizing and deodorizing thereof prior to distillation, without necessitating the employment of sludge acids and the like as heretofore proposed.

Crude aromatic hydrocarbon oils have a penetrating unpleasant odor, darken readily on exposure to light and contain a considerable quantity of non-volatile matter which remains as a residue in the still. After treatment in accordance with my improved process the oil has a pleasant aromatic odor, its non-volatile residue is materially reduced, and it does not lose its "water-white" color when exposed to light and air.

My process consists broadly of the treatment of the crude aromatic hydrocarbons, such as crude benzol, with an aqueous solution of copper sulfate ($CuSO_4$) and I have found the following proportions and method of treatment to give a superior product: The oil to be treated which may be in the cold or at any temperature below that of distillation, is placed in an agitator or mixer of any efficient type to which is added a saturated solution of copper sulfate in the proportion of 10 to 33 pounds of the hydrous salt to 1000 gallons of oil. The agitator is then operated for 15 or 20 minutes to thoroughly mix the oil and the aqueous solution; after which the mixture is allowed to stand until the aqueous layer settles to the bottom of the vessel which will require not more than 15 minutes for a thousand gallon charge. The aqueous layer which will contain any unchanged copper sulfate and any compounds formed by the chemical action is then drawn off and the oil distilled in an ordinary steam still, preferably under a pressure of 3–7 atmospheres. The foregoing treatment results apparently in a direct chemical combination between the so-called acetylene compounds or the like and the copper sulfate without decomposition of the latter, forming one of the peculiar copper sulfate esters of acetylene and its homologues. In addition to this apparently certain sulfur compounds are precipitated as copper sulfid, and certain basic compounds, such as pyridin, are removed as sulfates, with simultaneous formation of copper hydroxid. The purified oil, when distilled, produces a substantially odorless product of a permanent "water-white" color, as stated.

I am aware that certain salts such as mercuric chlorid have been proposed for treatment of hydrocarbons in order to remove the sulfur compounds therefrom. In such an instance however it was necessary to subsequently remove the mercuric chlorid by means of a second reagent such as hydrogen sulfid and the result was that instead of deodorizing the product and decolorizing the same, a process was executed which was complicated and expensive and was quite unsatisfactory for the very purpose for which it was intended. I am also aware that the treatment of petroleum distillates with sulfuric acid and copper to remove sulfur compounds has been proposed and that various patents have been granted on generally similar processes for the treatment of petroleum distillates. I make no claim to such processes, for the same are entirely inapplicable to crude aromatic hydrocarbons which, as is well known, are entirely dissimilar, particularly as regards their chemical activity, to the petroleum derivatives.

Having thus described my invention, what I claim and desire to secure by Letters Patent is:—

1. The process of purifying aromatic hydrocarbons containing the benzene ring which consists in causing an aqueous solution of a metallic sulfate to react therewith at a temperature below the point at which distillation of the volatile ingredients of the mixture occurs.

2. The process of purifying aromatic hydrocarbons containing the benzene ring which consists in causing an aqueous solution of a copper salt to react therewith at a temperature below the point at which distillation of the volatile ingredients of the mixture occurs.

3. The process of purifying aromatic hydrocarbons containing the benzene ring which consists in causing a solution of copper sulfate to react therewith at a temperature below the point at which distillation of the volatile ingredients of the mixture occurs.

4. The process of purifying aromatic hydrocarbons containing the benzene ring which consists in intimately mixing the oil to be purified with an aqueous solution of copper sulfate in the proportions of 1 to 3 pounds of the hydrous salt to about 100 gallons of oil, allowing the mixture to settle, and drawing off the aqueous layer, and then distilling the remaining oil to remove its non-volatile residue.

5. The process of purifying crude aromatic hydrocarbons containing the benzene ring, which consists in subjecting such hydrocarbons to the action of an aqueous solution of a salt of a metal capable of forming salts of different degrees of oxidation.

In witness whereof, I have hereunto set my hand in the city, county and State of New York, this 18th day of Jany., 1913.

JOHN M. WEISS.

Witnesses:
  WM. MACMULLEN,
  S. R. CHURCH.